(12) United States Patent
White et al.

(10) Patent No.: US 7,120,084 B2
(45) Date of Patent: Oct. 10, 2006

(54) INTEGRATED MEMORY CONTROLLER

(75) Inventors: Theodore C. White, Margarita, CA (US); Dinesh Jayabharathi, Orange, CA (US)

(73) Assignee: Marvell International Ltd., Hamilton (BM)

( * ) Notice: Subject to any disclaimer, the term of this patent is extended or adjusted under 35 U.S.C. 154(b) by 157 days.

(21) Appl. No.: 10/867,113

(22) Filed: Jun. 14, 2004

(65) Prior Publication Data

US 2005/0276151 A1 Dec. 15, 2005

(51) Int. Cl.
*G11C 8/18* (2006.01)
(52) U.S. Cl. ...................... 365/233; 365/194
(58) Field of Classification Search ............. None
See application file for complete search history.

(56) References Cited

U.S. PATENT DOCUMENTS

| | | | |
|---|---|---|---|
| 3,800,281 A | | 3/1974 | Devore et al. |
| 3,823,393 A | * | 7/1974 | Norris ..................... 400/63 |
| 3,836,891 A | * | 9/1974 | McDaniel ................. 700/159 |
| 3,988,716 A | | 10/1976 | Fletcher et al. |
| 4,001,883 A | | 1/1977 | Strout et al. |
| 4,002,827 A | * | 1/1977 | Nevin et al. .............. 342/185 |
| 4,016,368 A | | 4/1977 | Apple, Jr. |
| 4,050,097 A | | 9/1977 | Miu et al. |
| 4,080,649 A | | 3/1978 | Calle et al. |
| 4,156,867 A | | 5/1979 | Bench et al. |
| 4,225,960 A | | 9/1980 | Masters |
| 4,275,457 A | | 6/1981 | Leighou et al. |
| 4,390,969 A | | 6/1983 | Hayes |
| 4,451,898 A | | 5/1984 | Palermo et al. |
| 4,486,750 A | | 12/1984 | Aoki |
| 4,500,926 A | | 2/1985 | Yoshimaru |
| 4,587,609 A | | 5/1986 | Boudreau et al. |
| 4,603,382 A | | 7/1986 | Cole |
| 4,625,321 A | | 11/1986 | Pechar et al. |
| 4,667,286 A | | 5/1987 | Young et al. |
| 4,680,647 A | * | 7/1987 | Moriyama .................. 386/112 |
| 4,777,635 A | | 10/1988 | Glover |
| 4,805,046 A | | 2/1989 | Kuroki et al. |
| 4,807,116 A | | 2/1989 | Katzman et al. |
| 4,807,253 A | | 2/1989 | Hagenauer et al. |
| 4,809,091 A | | 2/1989 | Miyazawa et al. |
| 4,811,282 A | | 3/1989 | Masina |
| 4,812,769 A | | 3/1989 | Agoston |
| 4,860,333 A | | 8/1989 | Bitzinger et al. |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 pages.

(Continued)

*Primary Examiner*—Tan T. Nguyen

(57) ABSTRACT

A system and circuit for reading and writing data to a buffer memory, which is Synchronous Dynamic Random access Memory ("SDRAM"), or Double Data Rate-Synchronous Dynamic Random Access Memory ("DDR") is provided. The circuit includes logic for managing programmable clock signal relationships such that data arrives at an optimum time for writing. Data that is to be written at DDR is moved from a first buffer clock to a DDR write clock signal and to a DQS signal that is based on a SDRAM clock signal. Also, plural tap-cells may be used to delay clock signals such that data and clock signals are aligned. An emulated DQS signal in a DDR capture scheme is used for reading from a SDRAM.

5 Claims, 11 Drawing Sheets

U.S. PATENT DOCUMENTS

| | | |
|---|---|---|
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,339,443 A | 8/1994 | Lockwood |
| 5,361,266 A | 11/1994 | Kodama et al. |
| 5,361,267 A | 11/1994 | Godiwala et al. |
| 5,408,644 A | 4/1995 | Schneider et al. |
| 5,410,554 A * | 4/1995 | Watanabe .................... 714/769 |
| 5,420,984 A | 5/1995 | Good et al. |
| 5,428,627 A | 6/1995 | Gupta |
| 5,440,751 A | 8/1995 | Santeler et al. |
| 5,450,546 A * | 9/1995 | Krakirian ..................... 710/57 |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini et al. |
| 5,546,545 A | 8/1996 | Rich |
| 5,546,548 A | 8/1996 | Chen et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,592,404 A | 1/1997 | Zook |
| 5,600,662 A | 2/1997 | Zook et al. |
| 5,602,857 A | 2/1997 | Zook et al. |
| 5,615,190 A | 3/1997 | Best et al. |
| 5,623,672 A | 4/1997 | Popat |
| 5,627,695 A | 5/1997 | Prins et al. |
| 5,629,949 A | 5/1997 | Zook |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,719,516 A | 2/1998 | Sharpe-Geisler |
| 5,729,718 A | 3/1998 | Au |
| 5,740,466 A | 4/1998 | Geldman |
| 5,745,793 A | 4/1998 | Atsatt et al. |
| 5,754,759 A | 5/1998 | Clarke et al. |
| 5,758,188 A | 5/1998 | Applebaum et al. |
| 5,784,569 A | 7/1998 | Miller et al. |
| 5,794,073 A | 8/1998 | Ramakrishnan et al. |
| 5,801,998 A | 9/1998 | Choi |
| 5,818,886 A | 10/1998 | Castle |
| 5,822,142 A | 10/1998 | Hicken |
| 5,822,777 A * | 10/1998 | Leshem et al. ............. 711/167 |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,078,546 A * | 6/2000 | Lee ............................ 365/233 |
| 6,081,849 A | 6/2000 | Born et al. |
| 6,092,231 A | 7/2000 | Sze |
| 6,094,320 A | 7/2000 | Ahn |
| 6,124,994 A | 9/2000 | Malone, Sr. |
| 6,134,063 A | 10/2000 | Weston-Lewis et al. |
| 6,145,042 A * | 11/2000 | Walton ....................... 710/112 |
| 6,157,984 A | 12/2000 | Fisher et al. |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 3/2001 | Billings et al. |
| 6,278,567 B1* | 8/2001 | Nagasawa .................... 360/51 |
| 6,279,089 B1 | 8/2001 | Schibilla et al. |
| 6,297,926 B1 | 10/2001 | Ahn |
| 6,330,626 B1 | 12/2001 | Dennin et al. |
| 6,381,659 B1 | 4/2002 | Proch et al. |
| 6,401,149 B1 | 6/2002 | Dennin et al. |
| 6,470,461 B1 | 10/2002 | Pinvidic et al. |
| 6,477,110 B1* | 11/2002 | Yoo et al. ................... 365/233 |
| 6,487,631 B1 | 11/2002 | Dickinson et al. |
| 6,490,635 B1 | 12/2002 | Holmes |
| 6,530,000 B1 | 3/2003 | Krantz et al. |

| | | |
|---|---|---|
| 6,574,676 B1 | 6/2003 | Megiddo |
| 6,662,334 B1 | 12/2003 | Stenfort |
| 6,826,650 B1 | 11/2004 | Krantz et al. |
| 2001/0044873 A1 | 11/2001 | Wilson et al. |
| 2003/0037225 A1 | 2/2003 | Deng et al. |
| 2004/0179109 A1* | 9/2004 | Kurosawa ............... 348/222.1 |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT Search Report for PCT/US01/22404, mailed Jan. 29, 2003, 4 Pages.

* cited by examiner

SDRAM SIGNALS

DDR WRITE SIGNALS

DDR Read Logic tAC Timing Diagram tDQSCK Timing Diagram tDQSQ Timing Diagram

Read Data Capture Timing Diagram

SDRAM Read (183 MHz)

INTEGRATED MEMORY CONTROLLER

BACKGROUND OF THE INVENTION

1. Field Of the Invention

The present invention relates generally to storage device controllers, and more particularly, to integrated memory controllers.

2. Background

Conventional computer systems typically include several functional components. These components may include a central processing unit (CPU), main memory, input/output ("I/O") devices, and streaming storage devices (for example, tape drives) (referred to herein as "storage device"). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage devices to the host system. Communications between the host system and the controller is usually provided using one of a variety of standard I/O bus interfaces.

Typically, when data is read from a storage device, a host system sends a read command to the controller, which stores the read command into the buffer memory. Data is read from the device and stored in the buffer memory.

Buffer memory may be a Synchronous Dynamic Random access Memory ("SDRAM"), or Double Data Rate-Synchronous Dynamic Random Access Memory (referred to as "DDR"). In SDRAM communication occurs at the positive end of a clock signal, i.e. data is received and read at the positive edge of a clock. Hence, SDRAM is a single data rate memory device.

DDR is a type of SDRAM that supports data transfers on both edges of each clock cycle (the rising and falling edges), effectively doubling the memory chip's data throughput. In DDR address and commands are similar to SDRAM, but the data is handled differently by using a separate clock ("DQS"). DQS is used for receiving and sending data from the DDR.

Modern storage systems may use either SDRAM or DDR and it is desirable to have a single interface that supports both DDR and SDRAM read and write operations. Conventional systems do not provide this option.

Therefore, there is a need for a method and system to support both DDR and SDRAM using the same hardware in the controller.

SUMMARY OF THE INVENTION

A system for writing data to a buffer memory, which is Synchronous Dynamic Random access Memory ("SDRAM"), or Double Data Rate-Synchronous Dynamic Random Access Memory ("DDR") is provided. The system includes, means for managing programmable clock signal relationships such that data arrives at an optimum time for writing. Data that is to be written at DDR is moved from a first buffer clock to a DDR write clock and to a DQS signal that is based on a SDRAM clock signal.

A circuit for writing data to a buffer memory, which is Synchronous Dynamic Random access Memory ("SDRAM"), or Double Data Rate-Synchronous Dynamic Random Access Memory ("DDR") is provided. The circuit includes logic for managing programmable clock signal relationships such that data arrives at an optimum time for writing. Data that is to be written at DDR is moved from a first buffer clock to a DDR write clock signal and to a DQS signal that is based on a SDRAM clock signal. Also, plural tap-cells may be used to delay clock signals such that data and clock signals are aligned.

A circuit for reading data from a buffer memory, which is Synchronous Dynamic Random access Memory ("SDRAM"), or Double Data Rate-Synchronous Dynamic Random Access Memory ("DDR") is provided. The circuit includes logic for managing programmable clock signal relationships such that data that is read from the DDR is centered within a DQS signal, which is generated from the DDR and then appropriately delayed. The DQS signal is delayed with respect to the data that is read from the DDR and data from the DDR is placed in a register that is controlled by a delayed DQS signal.

A system for reading data from a buffer memory, which is Synchronous Dynamic Random access Memory ("SDRAM"), or Double Data Rate-Synchronous Dynamic Random Access Memory ("DDR") is provided. The system includes means for managing programmable clock signal relationships such that data that is read from the DDR is centered within a DQS signal generated from the DDR and then appropriately delayed. The DQS signal is delayed with respect to the data that is read from the DDR and data from the DDR is placed in a register that is controlled by a delayed DQS signal. Also, an emulated DQS signal in an SDRAM clock signal is used for reading from a SDRAM and a DDR capture scheme is used for reading data from an SDRAM.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a controller will initially be described. The specific architecture and operation of the preferred embodiment will then be described with reference to the general architecture.

Figure 1A:
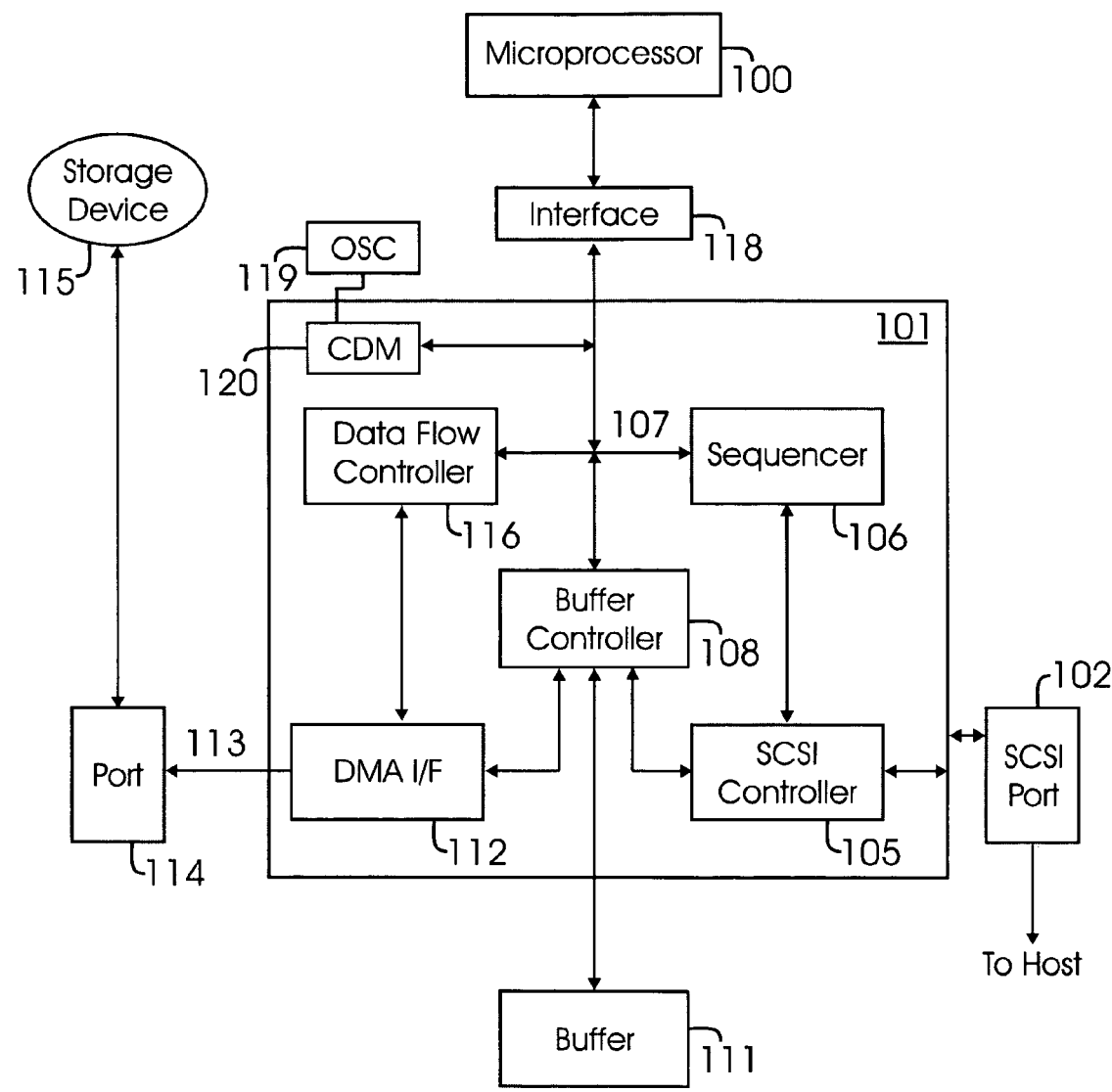
FIG. 1A is an example of a streaming storage drive system used according to one aspect of the present invention.

The system of FIG. 1A is an example of a streaming storage drive system (e.g., tape drive), included (or coupled to) in a computer system. The host computer (not shown) and the storage device 115 communicate via port 102, which is connected to a data bus (not shown). The data bus, for example, is a bus in accordance with a Small Computer System Interface (SCSI) specification. Those skilled in the art will appreciate that other communication buses known in the art can be used to transfer data between the drive and the host system. In an alternate embodiment (not shown), the storage device 115 is an external storage device, which is connected to the host computer via a data bus.

As shown in FIG. 1A, the system includes controller 101, which is coupled to SCSI port 102, port 114, buffer memory 111 and microprocessor 100. Interface 118 serves to couple microprocessor bus 107 to microprocessor 100. A read only memory ("ROM") omitted from the drawing is used to store firmware code executed by microprocessor 100. Port 114 couples controller 101 to device 115.

Controller 101 can be an integrated circuit (IC) that comprises of various functional modules, which provide for the writing and reading of data stored on storage device 115. Microprocessor 100 is coupled to controller 101 via interface 118 to facilitate transfer of data, address, timing and control information. Buffer memory 111 is coupled to controller 101 via ports to facilitate transfer of data, timing and address information. Buffer memory 111 may be a DDR or SDRAM.

Data flow controller 116 is connected to microprocessor bus 107 and to buffer controller 108. A DMA interface 112 is connected to microprocessor bus 107 and to data and control port 113.

SCSI controller 105 includes programmable registers and state machine sequencers that interface with SCSI port 102 on one side and to a fast, buffered direct memory access (DMA) channel on the other side.

Sequencer 106 supports customized SCSI sequences, for example, by means of a 256-location instruction memory that enables users to customize command automation features. Sequencer 106 support's firmware and hardware interrupts schemes. The firmware interrupt enables microprocessor 100 to initiate an operation within Sequencer 106 without stopping sequencer operation. Hardware interrupt comes directly from SCSI controller 105.

Buffer controller (also referred to as "BC") 108 connects to buffer memory 111, DMA I/F 112, a SCSI channel of SCSI controller 105 and bus 107. Buffer controller 108 regulates data movement into and out of buffer memory 111.

To read data from storage device 115, a host system sends a read command to controller 101, which stores the read, commands in buffer memory 111. Microprocessor 100 then read the command out of buffer memory 111 and initializes the various functional blocks of controller 101. Data is read from device 115 and is passed through DMA I/F 112 to buffer controller 108.

Controller 101 also includes a clock distribution module ("CDM") 120 that handles clock variation, according to one aspect of the present invention. FIG. 1C shows a block diagram of CDM 120 with an oscillator 119 coupled to phased locked loop ("PLL") 120A that includes an electronic circuit that controls oscillator 119 so that it maintains a constant phase angle (i.e., lock) on the frequency of an input, or reference, signal. PLL 120A is coupled to a voltage regulator ("VCO") 703 and to clock distribution logic ("CDL") 121 that generates a buffer clock ("BUFCLK") 701A.

Figure 1B:
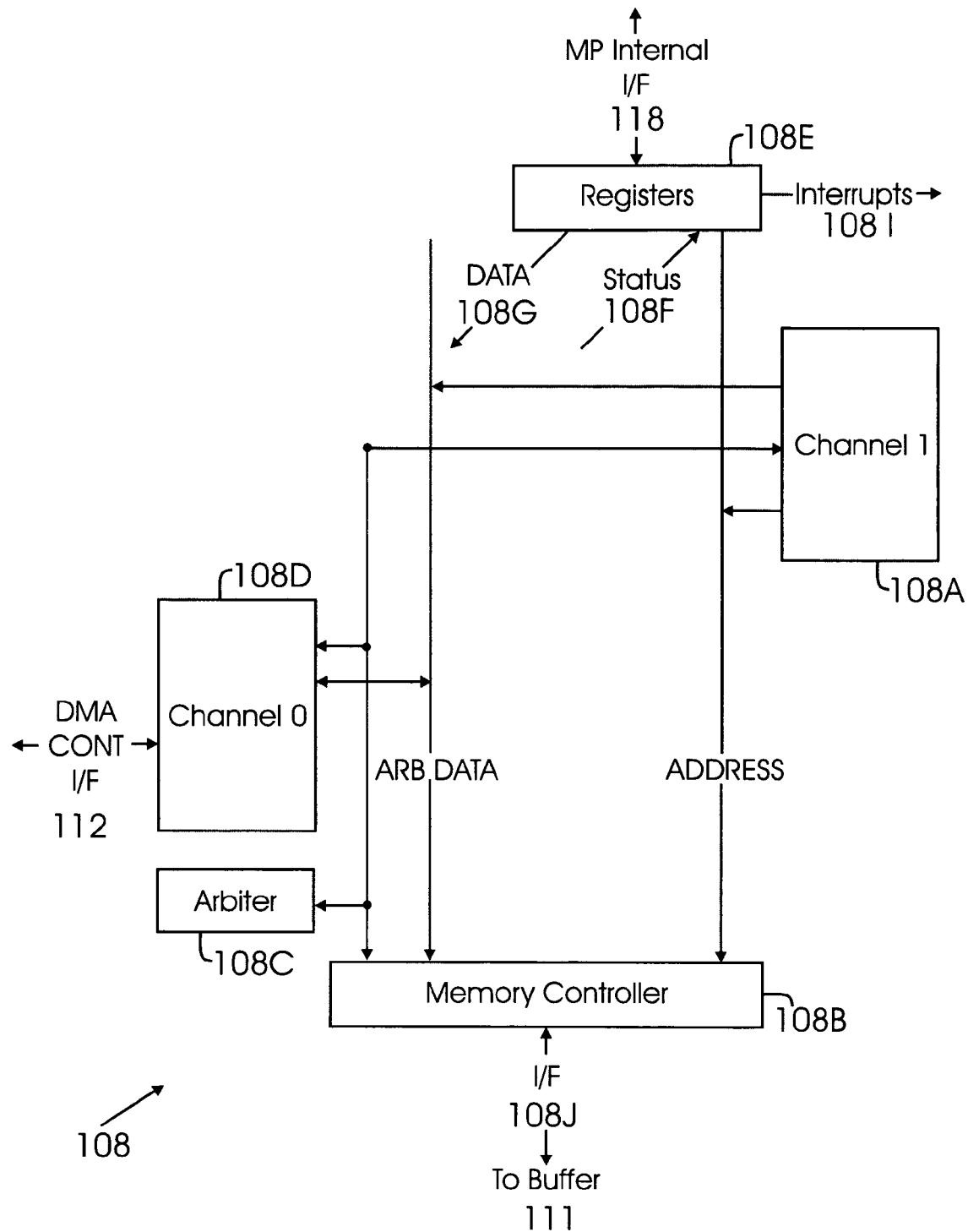
FIG. 1B is a block diagram of a buffer controller, according to one aspect of the present invention.
Figure 1C:
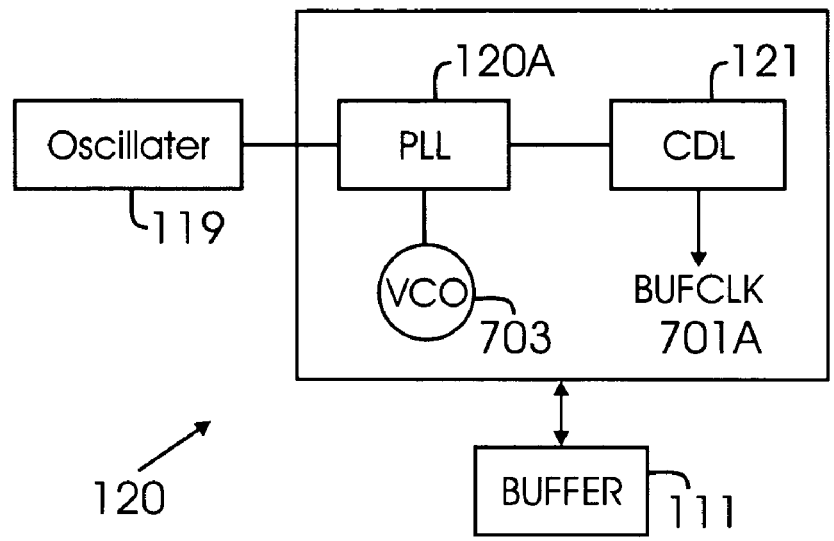
FIG. 1C is a block diagram of a clock distribution module, according to one aspect of the present invention.

FIG. 1B shows a block diagram of BC 108 with Channel 1 108A and Channel 0 108D for moving data to and from buffer 111. BC 108 includes registers 108E and an Arbiter 108C. Arbiter 108C arbitrates between plural channels in BC 108, for example, Channel 0 108D and Channel 1 108A. Register 108E is coupled to interface 118 via bus 107 that allows microprocessor 100 and BC 108 to communicate. Data 108G and status 108F is moved in and out of register 108E.

BC 108 also includes a multi-channel memory controller 108B that provides a common interface to either SDRAM or DDR buffer memory 111.

Before describing the adaptive aspects of the present invention, the following describes some of the clock signals that are used for buffer 111 read and write operations:

BUFCLK (Buffer Clock Signal): This is a clock signal that is used for running various modules of the memory controller 108B.

SDRAMCLK (SDRAM Clock Signal): This is a clock signal for SDRAM 111B.

DQS: This signal is used for sampling data.

DDR Write CLK: This clock signal is used for writing to DDR 111A.

BD_O: This is a buffer data output signal.

Figure 1D:
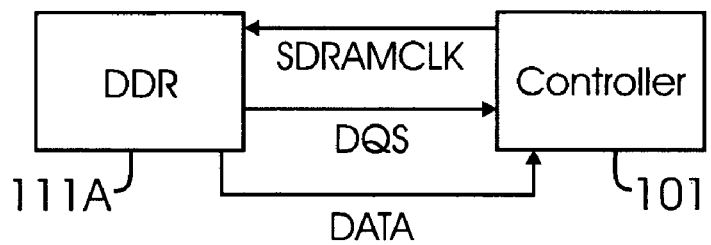
FIG. 1D is a block diagram of a DDR memory coupled to a controller, according to one aspect of the present invention.

FIG. 1D shows a top-level diagram where DDR 111A is the buffer memory 111. SDRAMCLK generated from controller 101 is sent to DDR 111A, while DQS (that is based on SDRAM CLK) and data comes from DDR 111A for a read operation. For a write operation, DQS is sent to DDR 111A, as described below in detail. As stated above, DQS is a bi-directional signal.

Figure 1E:
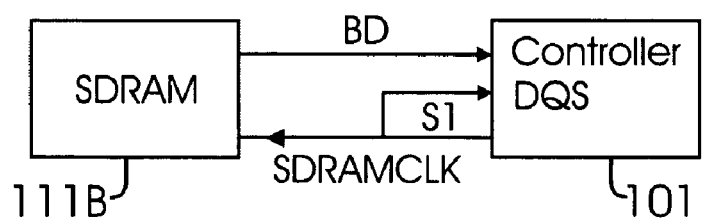
FIG. 1E shows a SDRAM coupled to a controller, according to one aspect of the present invention.

FIG. 1E shows a block diagram where SDRAM 111B is coupled to controller 101. Data ("BD") is read from SDRAM 111B and SDRAM clock is sent from controller 101. Data ("BD") moves biodirectionally from to/from SDRAM 111B.

In one aspect of the present invention, a system is provided such that a buffer clock (BUFFCLCK), SDRAM clock (SDRAMCLK) and a DDR data clock ("DQS") are handled in such a way that the same system (or logic) can be used to support either a DDR or SDRAM version of buffer memory 111.

DDR Write Operation:

In one aspect of the present invention a DDR write operation is conducted using programmable delay so that data arrives at the correct time outside controller 101. Data that is to be written at DDR 111A is moved according to BUFCLK to DDR Write CLK, and DQS is appropriately delayed for data sampling, as discussed below.

Figure 7:
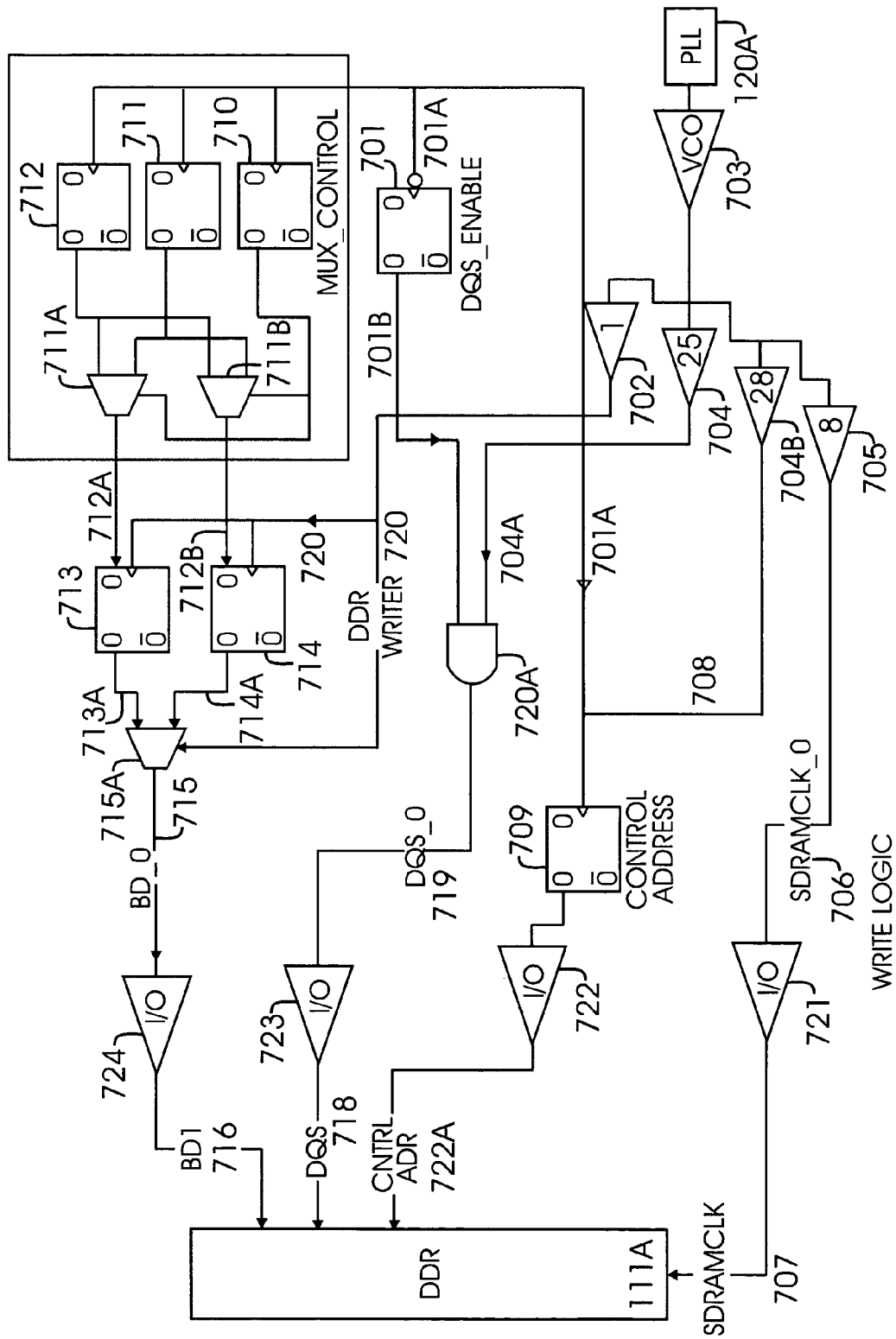
FIG. 7 shows a logic diagram for write operation, according to one aspect of the present invention.

FIG. 7 shows a schematic of the logic used for a DDR write operation. It is noteworthy that the same logic is used for SDRAM write operation.

For DDR write, all signals go from controller 101 to DDR 111A. The arrival time for data and DQS signal 718 are based on the timing diagram shown in FIG. 8. The clocks are aligned such that data lines up with the clock. The present invention uses a clocking relationship instead of delaying data. The programmable timing delays between BUFCLK 701A, SDRAMCLK 707, and DQS CLK 718 are provided by tap-cells 702, 704, 704B and 705 that are driven by voltage controlled oscillator ("VCO") 703.

Data that is written in DDR 111A is stored in registers 711 and 712 that are controlled by BUFCLK 701A using logic 710. In one aspect, registers 711 and 712 are 64 bits wide to hold data. Data from registers 711 and 712 (shown as 712A and 712B via logic 711A and 711B) is moved to registers 713 and 714 that receive the DDR Write CLk 720 from tap cell 702. Signal 720 may be delayed using cell 702A.

BD_O 715 (data output) is generated based on inputs 713A and 714A from registers 713 and 714 (via multiplexer 715A), respectively. Input/Output ("I/O") cell 724 generates BD 716, which is the actual data that is sent to DDR 111A.

DQS_O (DQS output) signal 719 is generated based on DQS free running signal 704A generated from tap cell 704 and 701B signal from DQS enable logic 701. DQS enable logic 701 receives BUFCLK 701A and generates signal 701B to enable the DQS signal. Signal 704A and 701B are "ANDED" by gate 720A to generate DQS_O 719. Thereafter, DQS_O 719 is sent to I/O cell 723 that generates DQS 718 that is sent to DDR 111A.

SDRAMCLK 707 is generated by input/output (I/O) cell 721 based on signal 706 generated (or delayed using cell 705A) by tap cell 705.

Control address logic 709 receives BUFCLK 701A and delay signal 708 from tap-cell 704B. I/O cell 722 generates control address 722A that is sent to DDR 111A that determines where data is written.

Figure 8:
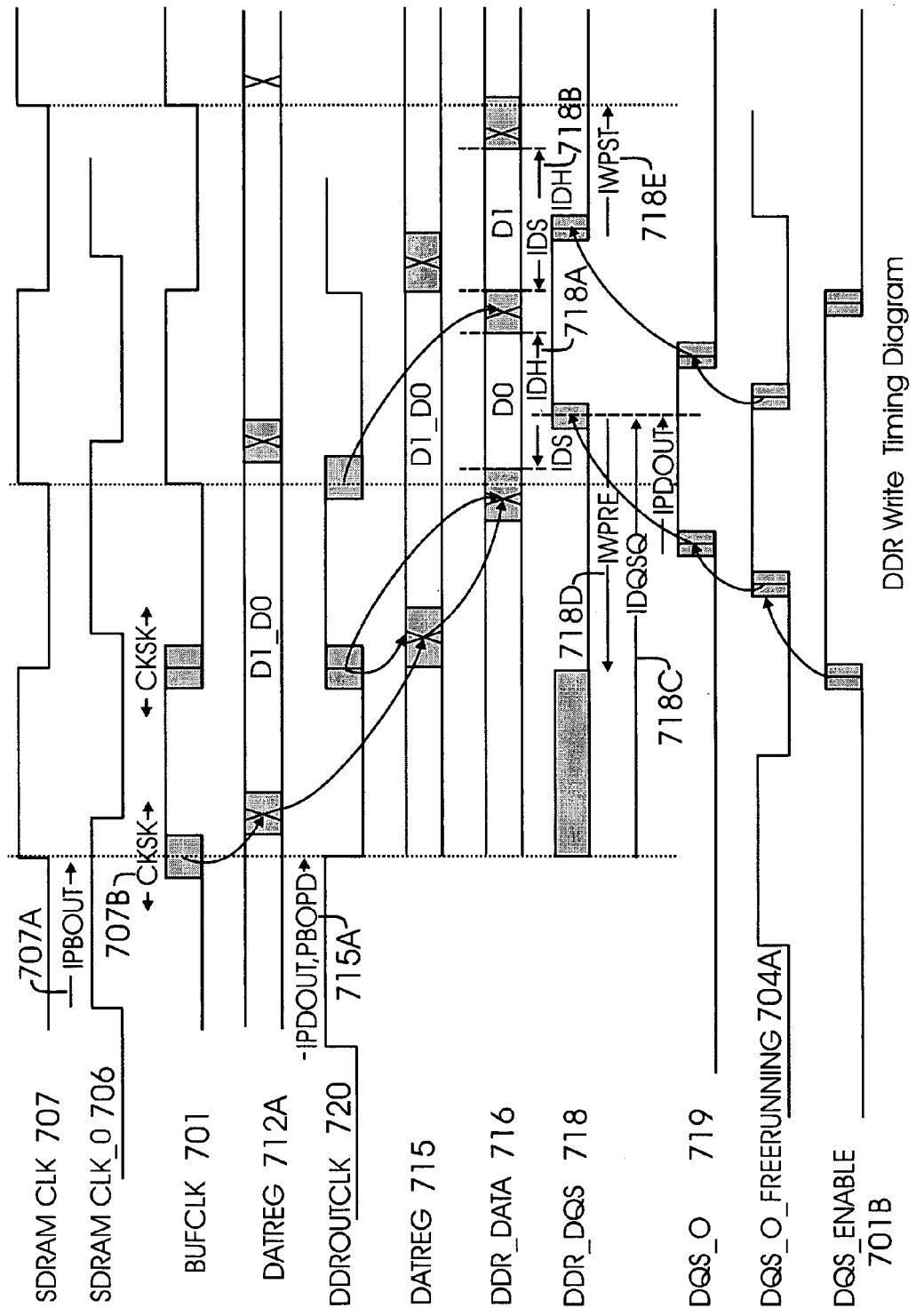
FIGS. 8–9 show timing diagrams, according to one aspect of the present invention.

FIG. 8 shows a timing diagram of various signals from FIG. 7, according to the adaptive aspects of the present invention. FIG. 8 shows that SDRAMCLK 707 and BUFCLK 701A are synchronous. Output I/O cell delay 707A is based on I/O cell 721. BD_O delay is based on I/O cell 724. tDH (718A) is the DDR data hold time based on DQS 718 for DDR writes, while tDS (718B) is the data setup time based on DQS 718 for DDR writes. CLSK 707B is the clock skew between BUFCLK 701A and SDRAMCLK 707. IDQSS 718C is the first DQS rising edge for DDR write bursts, while tWPRE 718D is the time that DQS 718 is low before the first rising edge. TWPST 718E is the time DQS 718 is low after the last DQS 718 falling edge. DDR data (shown as BD 716 in FIG. 7) 716 is sampled (D0) at the rising edge of DQS 718 and D1 is sampled at the falling edge of 718.

BUFCLK 701A is re-timed to DDR write clock 720 that is generated by tap cell 702. DQS 718 is aligned to the center of BD_O 715. DQS signal 718 is timed so that it is later than SDRAMCLK_O 706 to provide set-up time from the start of the "data valid" window. The negative edge of BUFFCLK 701A is used to control the enabling of DQS_O clock 719. The timing for DQS 718 is optimum so that it is not too early or late.

Figure 8A:
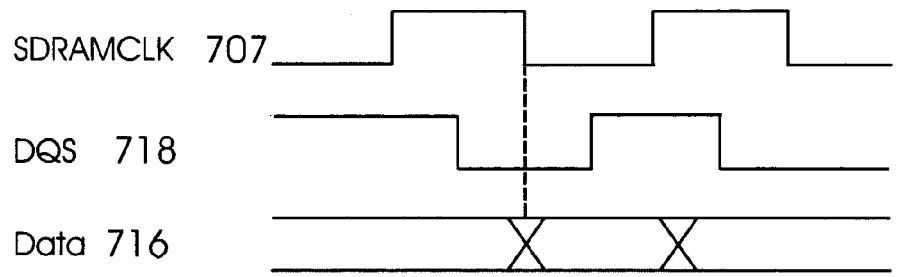

FIG. 8A shows a simplified timing diagram with SDRAMCLK 707, DQS 718 and data 716 signals. FIG. 8A shows that data 716 is sampled at the rising and falling edge of DQS 718 and DQS 718 is approximately in the middle of data 716.

Figure 1F:
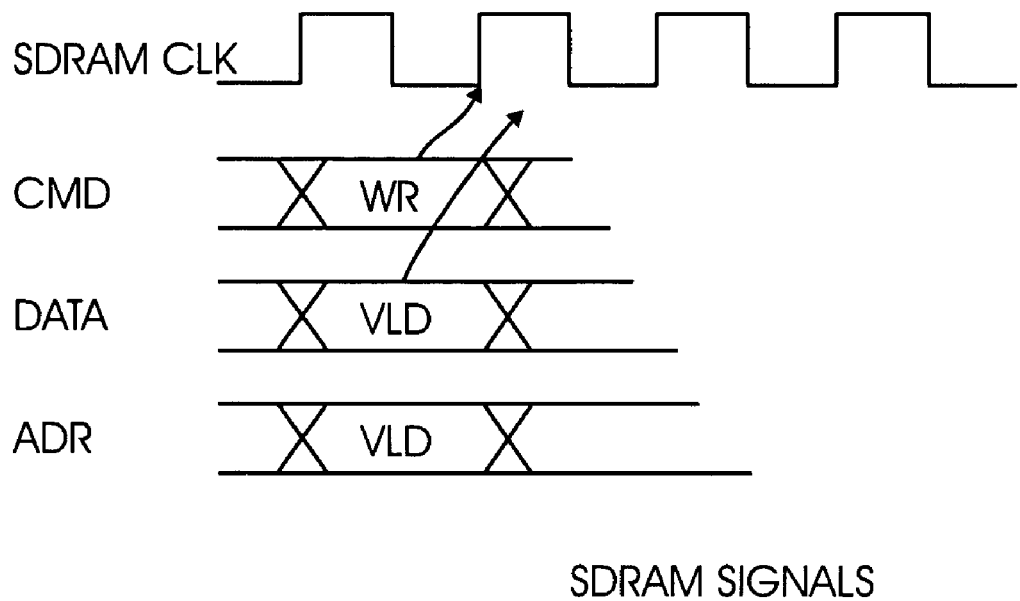
FIG. 1F shows a timing diagram for SDRAM signals.
Figure 1G:
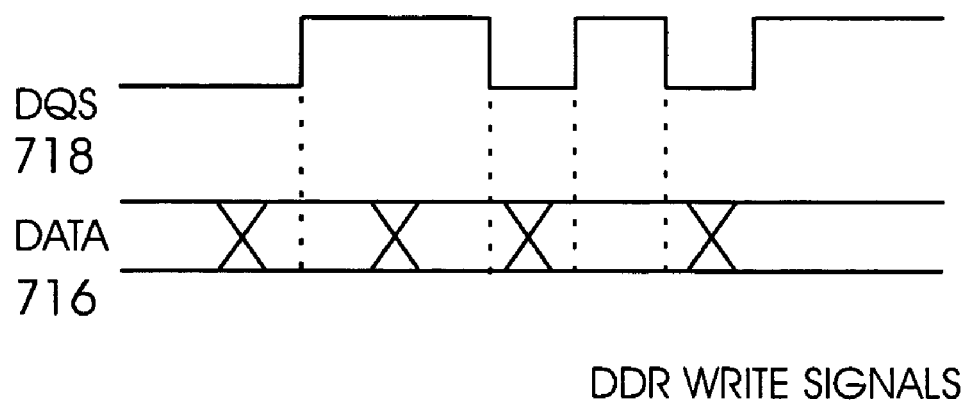
FIG. 1G shows DDR write signals used according to one aspect of the present invention.

FIG. 1G shows yet another simplified timing diagram showing how DQS 718 and data 716 are positioned for DDR 111A write operation.

Figure 2:
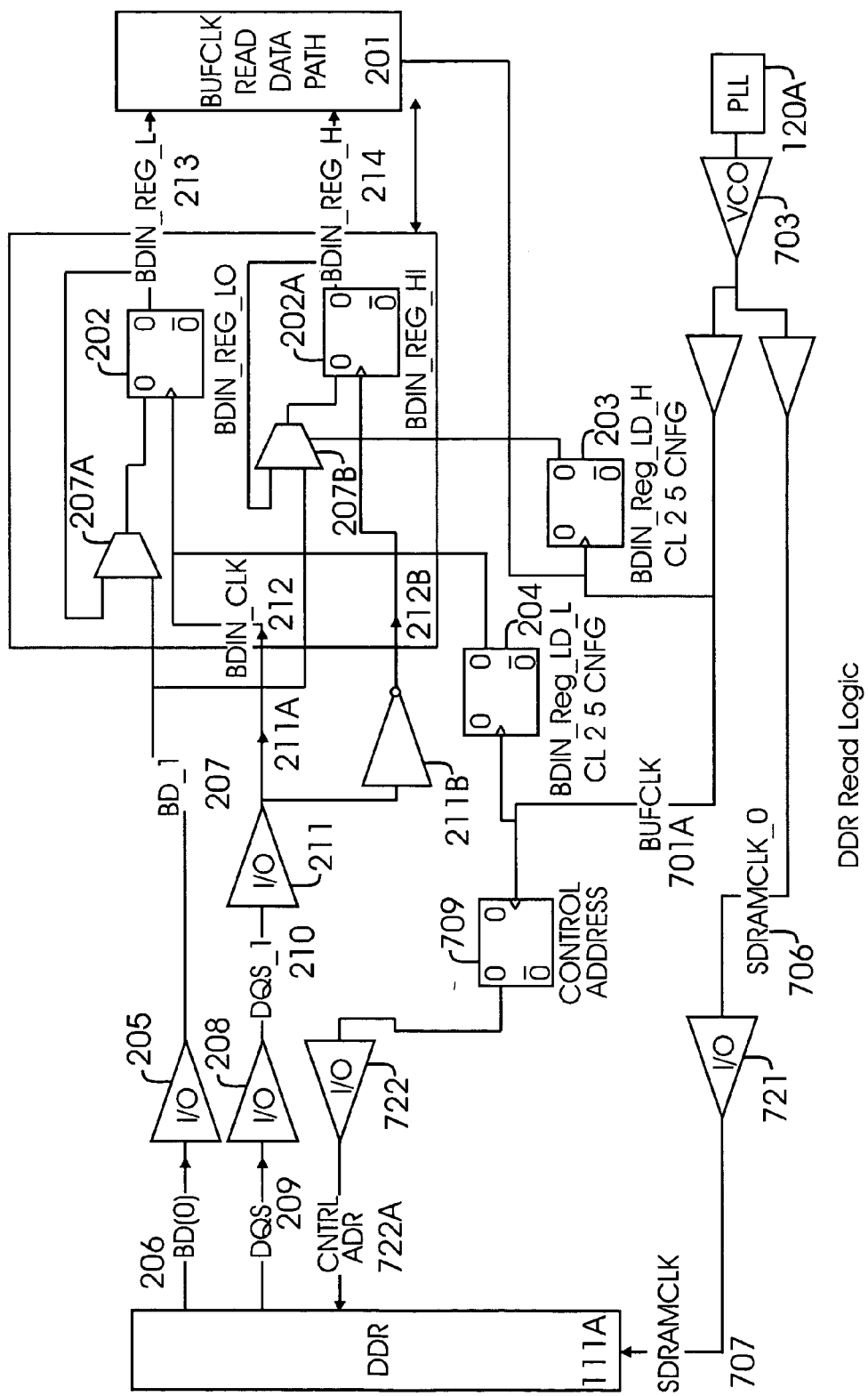
FIG. 2 shows DDR logic that can also be used for SDRAM read operations using an emulated DQS signal, according to one aspect of the present invention.

DDR Read Operation:

FIG. 2 shows a schematic of the logic that is used for reading data from DDR 111A and SDRAM 111B. DQS 209 and data 206 are generated from DDR 111A. The DQS 209 clock signal is generated based on SDRAMCLK 707, which is based on input 706 to I/O cell 721. DQS 209 clock signal is sent to I/O cell 208 that generates DQS_I 210, which is delayed by cell 211. DQS 209 is delayed so that the DQS clock signal is centered within a valid data window.

Registers 202 and 202A are used to capture data and in one aspect operate as a first in first out ("FIFO") buffer. The delayed DQS 211A signal that is referenced as BDIN_CLK 212 and 212B (that is generated after 211A passes through an inverter 211B) is used to control registers 202 and 202A, respectively. It is noteworthy that the delay in the DQS signal may be programmed using cells 211C and 211D by controller 101 firmware.

Data 206 from DDR 111A via I/O cell 205 (as output BD_I 207) is sent to registers 202 and 202A, via logic 207A and 207B. Once data is captured in registers 202 and 202A, it is moved (shown as 213 and 214) to another FIFO 201 that operates under BUFCLK 701A.

Figure 3:
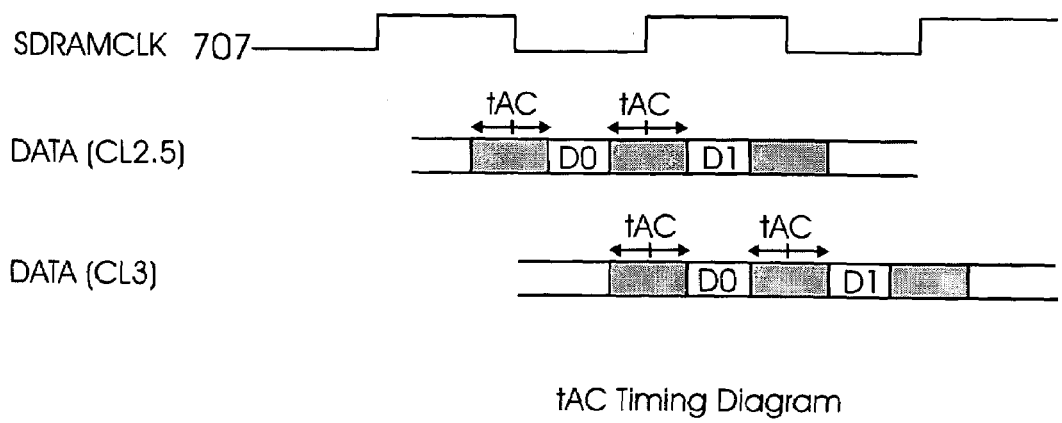
FIGS. 3–6 show various timing diagrams, according to one aspect of the present invention.

DQS 209 generated from DDR 111A may have plural alignments. Logic 203 and 204 controls the alignment of DQS 209 based on selected latency. For example, in one aspect (CL3, FIG. 3), the positive edge of DQS is aligned with the positive edge of SDRAMCLK 707 generated by I/O cell 721 based on SDRAMCLK_O 706, which is generated by VCO 703. In another aspect (CL2.5, FIG. 3), the negative edge of DQS is aligned with the negative edge. FIG. 3 shows alignment of data with SDRAMCLK 707 within +/− tAC nano-seconds.

Figure 4:
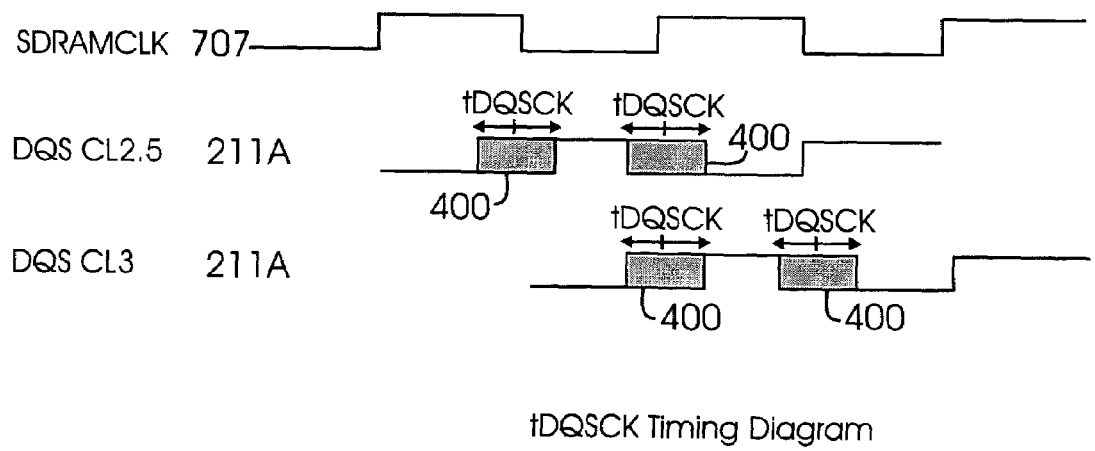

FIG. 4 shows the alignment of DQS 211A to SDRAMCLK 707 with latency CL 3 and CL 2.5, respectively. In CL3, the positive edge of DQS 211A is aligned with the positive edge of SDRAMCLK and in CL 2.5, the negative edge of DQS 211A is aligned with the positive edge of SDRAMCLK 707. In CL 3, the first data of the burst is valid 3 clocks after the rising edge of the read command. In CL 2.5, the first data of the burst is valid 2.5 clocks after the rising edge of the read command. The rising edge of DQS 211A is lined up with the leading edge of the first valid data window.

DQS 211A can vary by tDQSCK 400. Although the alignment of DQS 211A to SDRAMCLK 707 does not directly affect the loading of data into registers 202 and 202A, it does affect the positioning of BDIN_REG CLK 212 with respect to BUFCLK 701A.

Figure 5:
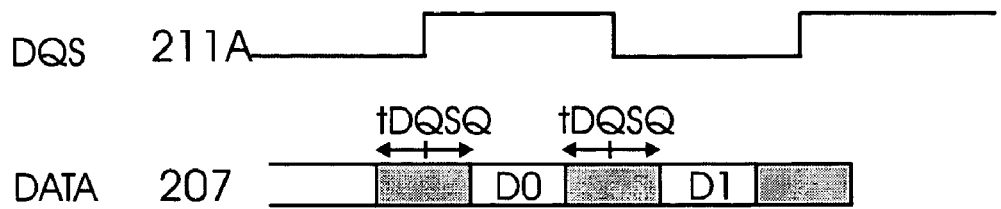

FIG. 5 shows a timing diagram of DQS 211A and data 207. In this case DQS 211A can vary by tDQSQ 500 nano-seconds.

Figure 6:
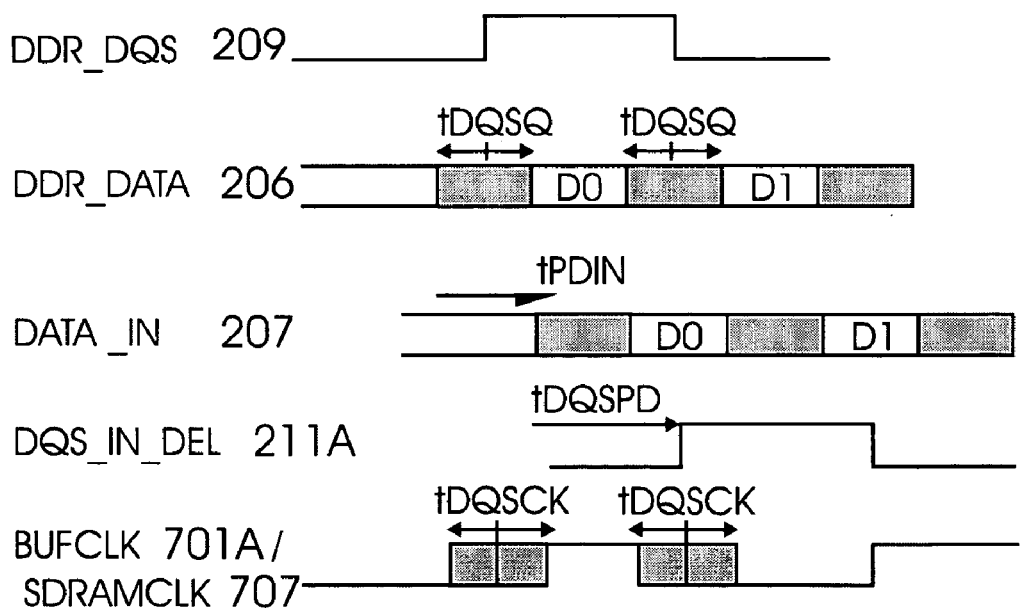

FIG. 6 shows the timing for data capture, where DQS 211A is delayed to provide setup/hold margin between clock and data inputs of registers 202 and 202A. "tDQSQ" is the data skew from DQS 211A, "tPDIN" is the I/O cell delay to destination, and "tDQSPD" is additional delay for DQS 211A.

SDRAM Write Operation:

SDRAM 111B write SDRAM CLK 707 that operates synchronously with BUFCLK 701A controls operation. SDRAM CLK 707 may be delayed from BUFCLK 701A to gain some set-up and hold time for the read operation. FIG. 1F shows a timing diagram for writing data to SDRAM 111B.

Figure 1H:
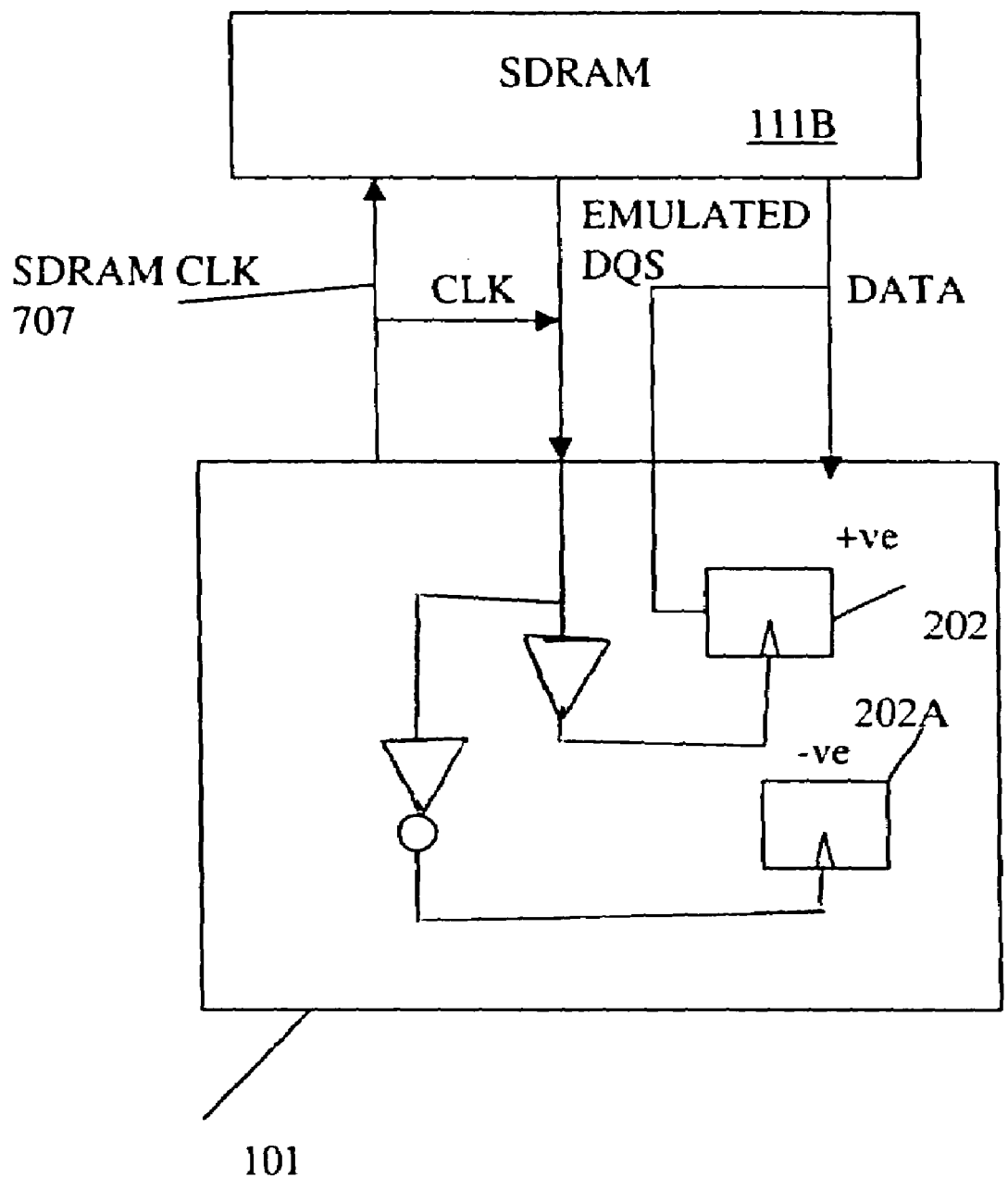
FIG. 1H is a block diagram showing an emulated DQS signal for an SDRAM operation, according to one aspect of the present invention.

SDRAM Read Operation: FIG. 1H shows a top-level block diagram for an SDRAM 111B operation using the same logic fpr controller 101. DQS signal is emulated for an SDRAM 111B read operation. The SDRAM clock 707 is fed into the DQS signal, which then becomes the emulated DQS signal. For an SDRAM 111B read operation, only the positive edge flop 202 (also shown in FIG. 2) is used. For a DDR operation both 202 and 202A are used. By using the SDRAM clock 707 and the emulated DQS signal, extra logic is not required and hence this saves overall cost for controller 101.

Figure 9:
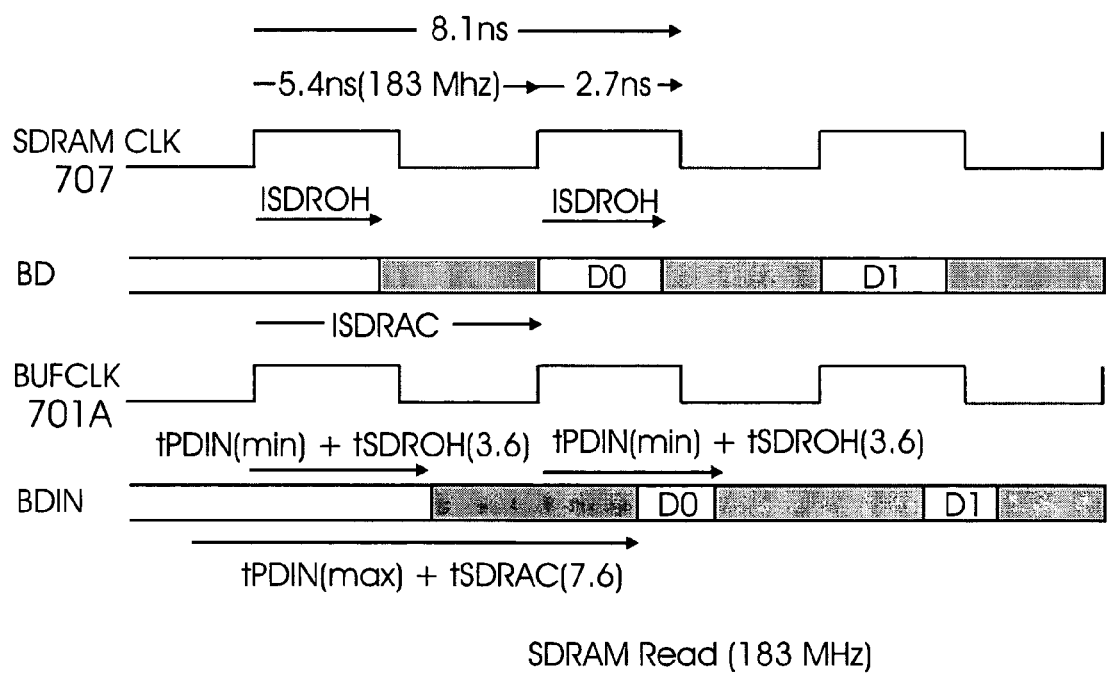

SDRAM read operation is synchronous with SDRAM-CLK 707 and BUFCLK 701A. In some instances, for example, at 183 MHZ, the data read delay (tSDRAC) from SDRAM 111B is equal to the clock period. FIG. 9 shows the timing diagram for SDRAM 111B read operation at 183 MHz. It is noteworthy that the present invention is not limited to any particular frequency rate. FIG. 9 shows SDRAMCLK 707, BUFCLK 701A, data ("BD") and BDIN Clock signal (derived from BUFCLK). "tSDRAC" is the time SDRAM 111B data read output delay; "tSDROH" is the SDRAM data read output data hold-time; and "tPDIN" is the input I/O cell delay to destination.

In one aspect of the present invention, the same logic is used to read and/or write data to DDR or SDRAM, hence overall controller cost is reduced.

Although the present invention has been described with reference to specific embodiments, these embodiments are illustrative only and not limiting. Many other applications and embodiments of the present invention will be apparent in light of this disclosure.

What is claimed is:

1. A system for writing data to a buffer memory, which is Synchronous Dynamic Random access Memory ("SDRAM"), or Double Data Rate-Synchronous Dynamic Random Access Memory ("DDR"), comprising:

means for managing programmable clock signal relationships such that data arrives at an optimum time for writing, wherein data that is to be written at DDR is moved according to a first buffer clock and then according to a DDR write clock and to a DQS signal that is based on a SDRAM clock signal.

2. The system of claim 1, wherein data is centered within the DQS signal.

3. A circuit for writing data to a buffer memory, which is Synchronous Dynamic Random access Memory ("SDRAM"), or Double Data Rate-Synchronous Dynamic Random Access Memory ("DDR"), comprising:

logic for managing programmable clock signal relationships such that data arrives at an optimum time for writing, wherein data that is to be written at DDR is moved according to a first buffer clock and then according to a DDR write clock signal and to a DQS signal that is based on a SDRAM clock signal.

4. The circuit of claim 3, wherein the data is centered within the DQS signal.

5. A circuit for writing data to a buffer memory, which is Synchronous Dynamic Random access Memory ("SDRAM"), or Double Data Rate-Synchronous Dynamic Random Access Memory ("DDR"), comprising:

logic for managing programmable clock signal relationships such that data arrives at an optimum time for writing, where plural tap-cells may be used to delay clock signals such that data and clock signals are aligned.

* * * * *

UNITED STATES PATENT AND TRADEMARK OFFICE
CERTIFICATE OF CORRECTION

PATENT NO. : 7,120,084 B2
APPLICATION NO. : 10/867113
DATED : October 10, 2006
INVENTOR(S) : Theodore C. White et al.

It is certified that error appears in the above-identified patent and that said Letters Patent is hereby corrected as shown below:

Column 3, Line 55    Delete "support's" and insert --supports--
Column 4, Line 50    Delete "bi0directionally" and insert --bi-directionally--
Column 5, Line 15    Delete "CLk" and insert --CLK--
Column 6, Line 67    Delete "fpr" and insert --for--

Signed and Sealed this

Second Day of January, 2007

JON W. DUDAS
*Director of the United States Patent and Trademark Office*